United States Patent [19]

Youngers et al.

[11] Patent Number: 5,299,668

[45] Date of Patent: Apr. 5, 1994

[54] ASSEMBLY FOR DEPRESSING A VEHICLE PEDAL FOR BLEEDING BRAKES

[76] Inventors: William L. Youngers, P.O. Box 164; Delbert J. Youngers, P.O. Box 1205, both of Ephrata, Wash. 98823

[21] Appl. No.: 84,773

[22] Filed: Jun. 29, 1993

Related U.S. Application Data

[63] Continuation of Ser. No. 833,882, Feb. 11, 1992, abandoned.

[51] Int. Cl.⁵ ............................................. B60T 7/00
[52] U.S. Cl. ..................................... 188/352; 74/532; 254/DIG. 5
[58] Field of Search .................. 188/352, 3 H, 382; 74/532; 254/DIG. 5

[56] References Cited

U.S. PATENT DOCUMENTS

| | | | |
|---|---|---|---|
| 1,790,851 | 2/1931 | Weaver | 254/DIG. 5 X |
| 1,907,835 | 5/1933 | Langbein | 254/DIG. 5 X |
| 1,950,640 | 3/1934 | Twyman | 254/DIG. 5 X |
| 2,157,355 | 5/1939 | Shroyer | 254/DIG. 5 X |
| 2,177,469 | 10/1939 | White | |
| 2,499,563 | 3/1950 | Bill | |
| 2,649,814 | 8/1953 | Brazell | 254/DIG. 5 X |
| 2,711,228 | 6/1955 | Shank | 74/532 X |
| 2,964,965 | 12/1960 | Hanson | 74/532 X |
| 3,313,110 | 4/1967 | Von Rohr | |
| 3,877,318 | 4/1975 | Castoe | 74/482 X |
| 4,779,422 | 10/1988 | Brown | |
| 5,012,689 | 5/1991 | Smith | 74/532 X |
| 5,031,729 | 7/1991 | Wittkop et al. | 188/3 H |

Primary Examiner—Matthew C. Graham
Attorney, Agent, or Firm—Hughes & Multer

[57] ABSTRACT

A remotely controlled actuator for depressing a brake pedal so as to permit the brake system to be bled by a single operator. There is a pneumatic cylinder having attachment fittings mounted to its ends, and these engage the brake pedal and the rim of the steering wheel. Compressed air is supplied to the pneumatic cylinder by way of a portable control valve, so that as this extends, one attachment fitting depresses the brake pedal while the other reacts against the steering wheel. The portable control valve is connected to the cylinder by long, flexible air hoses, so as to permit the operator to move from wheel cylinder to wheel cylinder. A pressure regulator allows the operator to adjust the pressure which is exerted on the brake pedal.

9 Claims, 3 Drawing Sheets

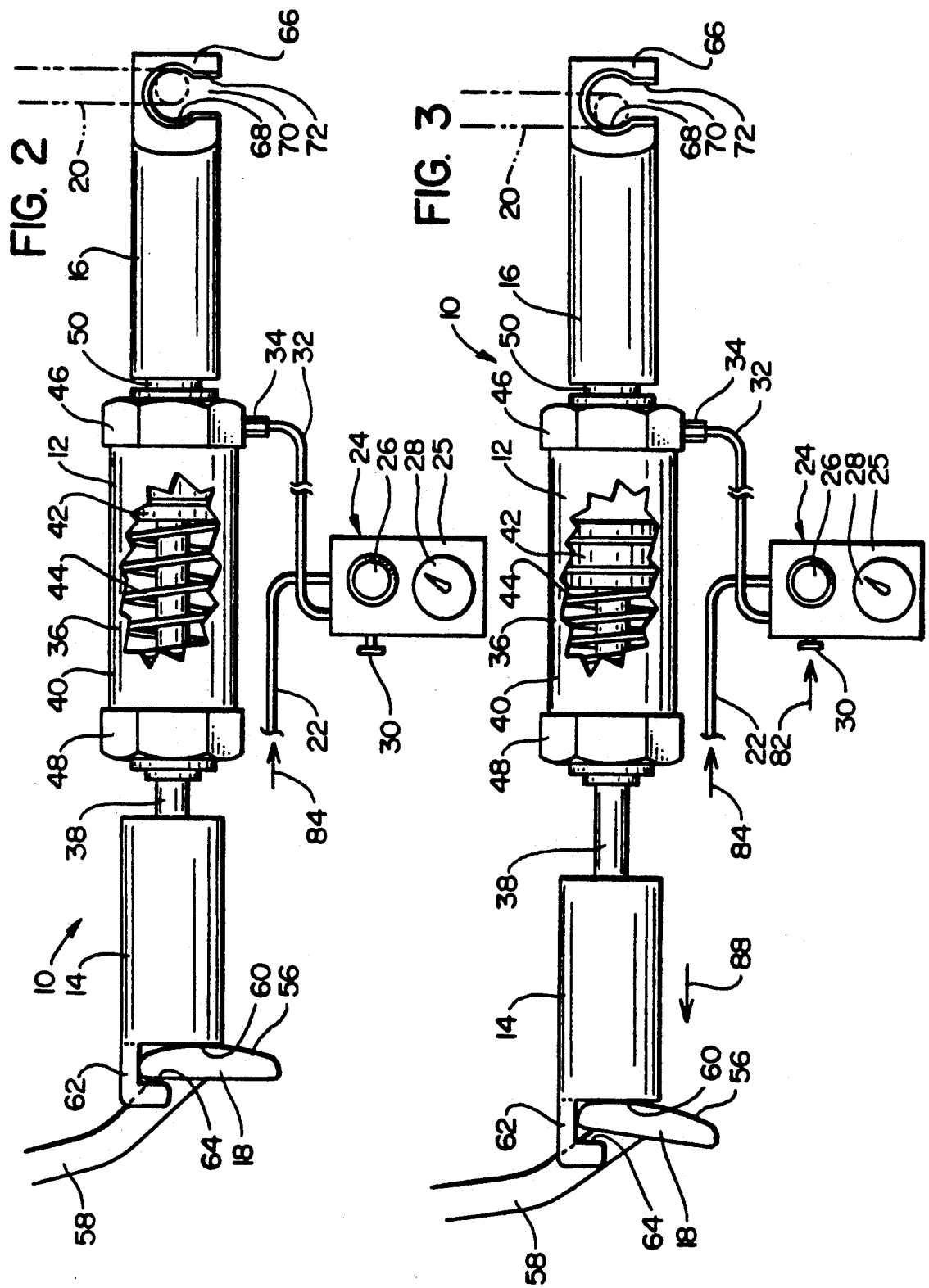

ASSEMBLY FOR DEPRESSING A VEHICLE PEDAL FOR BLEEDING BRAKES

This is a continuation of copending application Ser. No. 07/833,882 filed on Feb. 11, 1992 now abandoned.

FIELD OF THE INVENTION

This invention relates generally to service tools for hydraulic brake systems. More particularly, the present invention relates to a remotely controlled pneumatic cylinder which selectively pumps the brake pedal of a vehicle as the operator bleeds the brake system at a wheel cylinder.

BACKGROUND OF THE INVENTION

Motor vehicles are very commonly equipped with hydraulic brake systems, and these are almost universally fitted to modern automobiles and light trucks. Such systems have a master cylinder which is connected to a brake pedal which is depressed by the foot of the vehicle operator; as this is done, hydraulic fluid is forced from the master cylinder (which also includes a reservoir for supplying fluid to the system) through brake lines to the several wheel cylinders, causing their actuation.

After maintenance has been performed on a hydraulic brake system of this type, it is typically necessary to remove any air which may have been introduced into the system as a result of the various fittings and components having been disturbed. If this air is not removed, the bubbles in the brake lines and elsewhere will tend to compress when the system is actuated, causing "sponginess" and a loss of braking effectiveness. The process of removing the air from the brake system is commonly referred to as "bleeding". Typically, bleed screws are mounted at each of the wheel cylinders (as well as elsewhere in some systems) for permitting the air to escape at these points as hydraulic fluid is forced into the system from the master cylinder. Normally, the bleeding process requires two people. The first person goes to a selected wheel cylinder and operates the bleed screw, while the second person sits in the car and pumps the brake pedal; the first person observes the brake fluid and air bubbles flowing from the bleed screw, and opens and closes this, and shouts instructions to the second person to operate the brake pedal as necessary.

This conventional approach to brake bleeding is obviously fraught with serious deficiencies. Firstly, it requires the services of a two personnel, thus requiring excessive expenditure of valuable time and labor. Furthermore, the shouted instructions may not always be correctly interpreted by the person operating the brake pedal, or precisely responded to, so that the effort may be poorly coordinated. Also, the traditional technique requires one of the mechanics to sit in the car, which presents the potential for damage to the interior from oil and grease on the mechanics' clothing, or from tools inadvertently left in a pocket. Still further, many modern brake systems require an application of a very even amount of pressure to the brake pedal during each part of the bleeding operation, and such very even pressure is simply very difficult for a human operator to apply manually.

Attempts have been made to overcome some of these deficiencies. One approach has taken the form of what are known to those skilled in the art as "power bleeders". These are typically cannister-like containers which are partially filled with brake fluid and then pressurized with air. The brake fluid is fed under pressure through a flexible conduit to a fitting which is sealingly mounted to the reservoir on the master cylinder. The fluid pressure from the pressure bleeder is communicated through the master cylinder and brake lines to the wheel cylinders, so as to force fluid through the brake lines and evacuate the air. Such power bleeders are not completely satisfactory. Among the practical disadvantages which they exhibit is the fact that they are invariably messy to use, and spilled brake fluid can cause serious damage to a vehicle's paint finish. Furthermore, a number of specialized parts are required; due to the many configurations of master cylinders, there is no one "universal" type of fitting which will sealingly mount to all of these, and so even a reasonably well-equipped mechanic may find himself without suitable fittings for anything but the most ubiquitous systems. The need for all these specialized fittings also contributes to increased costs. Perhaps even more importantly, ordinary power bleeders can supply only a steady fluid pressure to the brake system, and cannot provide any sort of "pumping" action; this is becoming a more and more serious deficiency in view of the fact that this "pumping" action is required for the proper bleeding of the many modern anti-lock braking systems which are coming into use in both automobiles and light trucks.

Accordingly, there exists a need for a device which selectively pumps the brake pedal of a vehicle while the brake system is being bled by an operator who is located adjacent one of the wheel cylinders, remote from the brake pedal. Furthermore, there exists a need for such a device which is substantially universal in nature so that it can be detachably installed in at least the great majority of vehicles without requiring specialized attachment fittings. Also, a need exists for such a device which is able to deliver an equal and even amount of pressure to the brake pedal as each part of the system is bled. Still further, there is a need for such a device which is economical to fabricate and reliable to operate.

SUMMARY OF THE INVENTION

The present invention has solved the problems cited above, and comprises generally a remotely controllable actuator for depressing the pedal of a hydraulic brake system of a vehicle so as to permit the brake system to be bled by a single operator. The actuator comprises an attachment fitting which is configured to detachably engage the brake pedal; motive means are operatively connected to this so as to depress the pedal in response to actuation thereof, and portable control means are provided for selectively actuating the motive means. The portable control means are positionable adjacent a wheel cylinder of the vehicle so that a single operator is able to selectively depress the brake pedal while bleeding the brake system at the wheel cylinder.

Preferably, a second attachment fitting is operatively connected to the motive means, this second attachment fitting being configured to detachably engage a fixed portion of the vehicle so as to react against this when the motive means is actuated. The motive means may be a longitudinally extensible cylinder with the first and second attachment fittings mounted on its ends, and the second attachment fitting may be configured to engage the steering wheel of the vehicle so that the cylinder is positioned between the rim of the steering wheel and the brake pedal.

The extensible cylinder may be a pneumatic cylinder, with a supply of compressed air being provided for extending this. A control valve selectively supplies the compressed air to the cylinder, and a pressure regulator may be provided for reducing the compressed air to a predetermined pressure. Preferably, this regulator is adjustable so as to permit selection of a predetermined pressure such that the pneumatic cylinder exerts a predetermined force on the brake pedal. The control valve may be connected to the pneumatic cylinder by a flexible air hose which permits the operator to carry the control valve from wheel to wheel.

Preferably, the control valve is also configured to permit selective bleeding off of the air pressure from the pneumatic cylinder, so that biasing means which are mounted to the cylinder can move it back to a retracted position following each depression of the pedal. This biasing means may preferably be spring means, such as a coil return spring mounted within the pneumatic cylinder.

A method is also provided for depressing a brake pedal by remote control so as to permit the brake system to be bled by a single operator. The method comprises (1) engaging the brake pedal with an actuator, this actuator having an attachment fitting which is configured to detachably engage the pedal, and motive means operatively connected to the fitting so as to depress the pedal in response to actuation of the motive means, (2) positioning portable control means adjacent a wheel cylinder of the vehicle, and (3) selectively operating the control means so as to actuate the motive means and depress the brake pedal, while simultaneously bleeding the brake system at the wheel cylinder.

Preferably, the motive means is an extensible cylinder, and the method further comprises the steps of engaging the rim portion of the steering wheel of the vehicle with a second attachment fitting on the second end of the cylinder, so that the extensible cylinder is positioned generally between the pedal and the rim portion of the steering wheel, and then selectively operating the control means so as to actuate the cylinder, so that the second attachment fitting reacts against the rim portion of the steering wheel and the first attachment fitting depresses the pedal.

Preferably, the extensible cylinder is a pneumatic cylinder, and the method further comprises the steps of selectively operating the control valve so as to connect the cylinder with a source of compressed air so as to extend the cylinder, and then selectively bleeding the compressed air off from the cylinder so that biasing means which are mounted thereto bias the cylinder back to a retracted position in preparation for subsequent repeated depression of the pedal.

Preferably, the method also comprises the step of selectively adjusting the pressure of the compressed air which is connected to the pneumatic cylinder, so that the cylinder exerts a predetermined amount of force when depressing the pedal.

These and other features and advantages of the present invention will become apparent from a reading of the following detailed description with reference to the associated drawings.

BRIEF DESCRIPTION OF THE DRAWINGS

FIG. 2 is an elevational view of the actuator assembly of FIG. 1, showing this in a retracted position in which the brake pedal is in its upper, released position, and also showing a portion of the pneumatic cylinder broken away to reveal the coil return spring which is mounted therein;

FIG. 3 is an elevational view similar to that of FIG. 2, showing the brake actuator assembly in an extended configuration in which the brake pedal is depressed;

DETAILED DESCRIPTION

Figure 1:
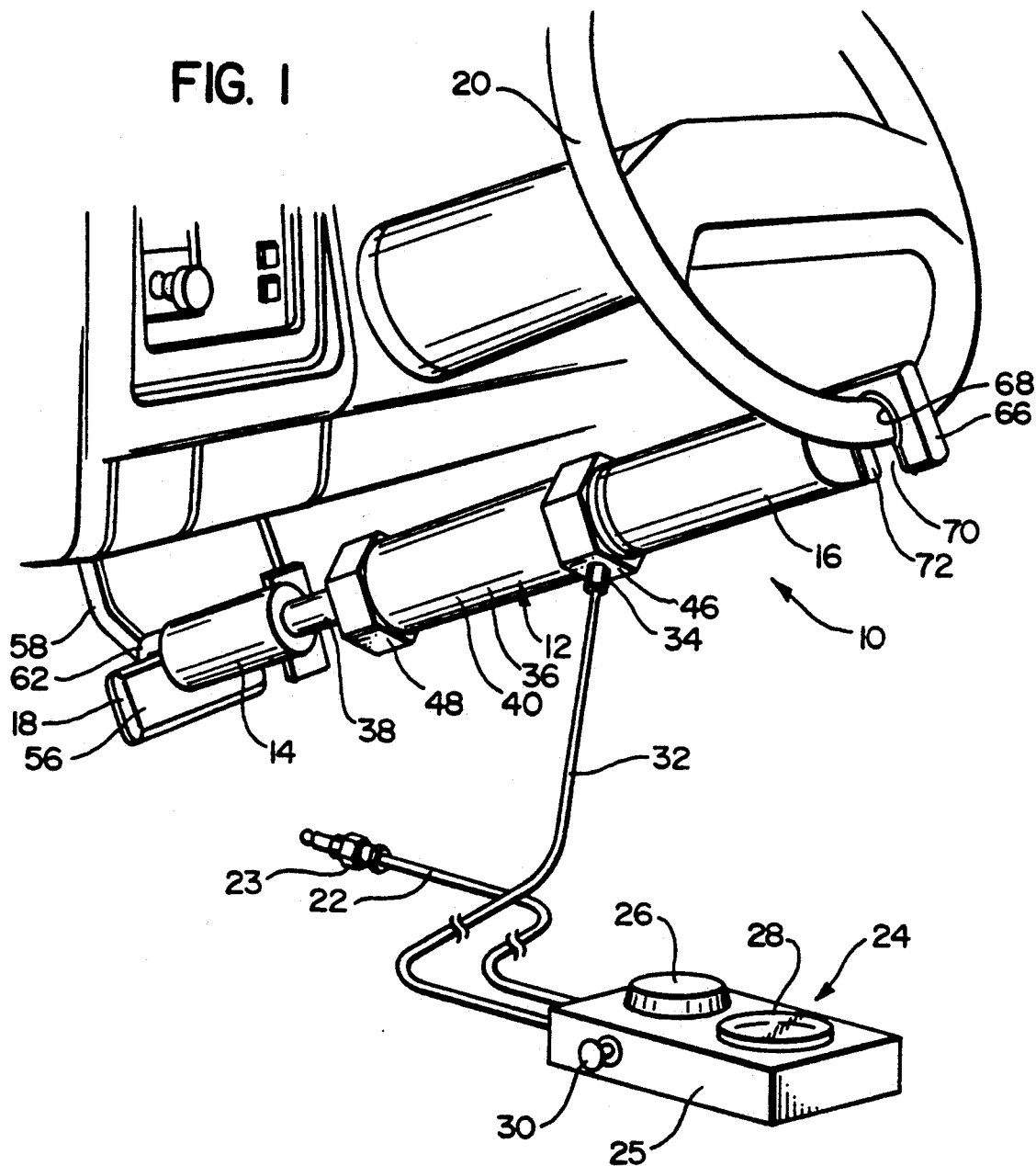
FIG. 1 is a perspective view showing the brake pedal actuation assembly incorporating the present invention temporarily installed on a vehicle, with one end of this being mounted to the brake pedal and the other end being mounted to a lower portion of the steering wheel rim.

FIG. 1 shows an actuator assembly 10 in accordance with the present invention temporarily installed in the passenger compartment of a vehicle preparatory to the use of this assembly to pump the brake pedal so that the brake system can be bled by an operator which controls operation of the actuator from his location adjacent one of the wheel cylinders (not shown). Actuator assembly 10 is made up generally of a central pneumatic cylinder 12 having a brake pedal attachment fitting 14 mounted to one end and a steering wheel attachment fitting 16 mounted to the other. When installed as shown in FIG. 1, the brake pedal attachment fitting 14 engages the brake pedal 18 of the vehicle, and the steering wheel attachment fitting 16 engages a lower portion of the rim of the steering wheel 20, so that the actuator assembly 10 is positioned generally between the brake pedal and the steering wheel.

As will be described in greater detail below, compressed air is supplied to actuator assembly 10 from a suitable source, such as a compressed air flask or tank, through a flexible compressed air supply line 22. One end of supply line 22 is provided with a suitable attachment fitting 23 for connection to the compressed air source, and the other end is connected to a portable air pressure control assembly 24. Control assembly 24 is provided with a housing 25 which encloses a conventional air pressure regulator (not shown in FIG. 1, but shown in FIG. 5), this being adjustable by means of a control knob 26, and a pressure gauge 28 which is connected to the output side of the regulator so that the operator can adjust the supply pressure down to a value which is suitable for the planned use of pneumatic cylinder 12. The reduced pressure air is fed from the regulator to a control valve (not shown in FIG. 1, but shown in FIG. 5) which is also enclosed within the housing, this being manually operable by means of a control button 30. From the control valve, the air pressure is fed to an attachment fitting 34 on pneumatic cylinder 12 through a control line 32; both control line 32 and the compressed air supply line 22 are flexible and of sufficient length to permit the operator to take the portable control assembly to positions adjacent each wheel cylinder.

Then, as control valve 30 is manipulated so that the control valve selectively supplies air pressure to pneumatic cylinder 12 via air lines 22 and 32, this causes pneumatic cylinder 12 to extend so as to move the brake pedal and steering wheel attachment fittings 14, 16 longitudinally apart from one another. As this is done, fitting 16 reacts against the stationary steering wheel 20, so that fitting 14 presses downwardly on brake pedal 18 and depresses this. If desired, the operator can hold the brake pedal in the depressed position by continuing to supply air pressure to cylinder 12 in this manner. When the operator subsequently desires the brake pedal 18 to return to its lifted position, as in preparation for a second stroke, he selectively switches the control valve to a second position in which the supply of pressurized air to pneumatic cylinder 12 is terminated, and the air pressure in cylinder 12 is bled off, back through control line 32. As this pressure is released, a coil return spring 44 (see FIG. 2) within pneumatic cylinder 12, which was under compression when the cylinder was extended, now biases cylinder 12 and actuator assembly 10 back to the retracted position.

In this manner, the operator can pump a brake pedal 18 up and down—either forcefully or gently—from his remote location adjacent a wheel cylinder, without having to have a second person in the car to do this, thus overcoming the problems of the traditional techniques which were discussed above.

Having provided an overview of the system of the present invention, a number of particular aspects will now be described in greater detail.

As previously noted, the central component of actuator assembly 10 is a pneumatic cylinder 12 which extends in response to compressed air being supplied to this. A pneumatic cylinder which has been found to be eminently suitable for this application is a 1 inch bore pneumatic cylinder having an 8 inch stroke and an internal return spring, cylinders of this kind being available from several manufacturers. Another, highly economical type of pneumatic cylinder which may be used in the actuator assembly of the present invention is a conventional automotive shock absorber of the type which is height-adjustable by being filled with air pressure, such as are commonly referred to by those skilled in the art as "air-adjustable" shock absorbers. Of course, a wide variety of other suitable pneumatic cylinders are available; it should also be noted at this point that, although the pneumatic-type cylinders discussed above are generally preferable for a variety of reasons, including their economy, reliability, and lack of "messiness", one skilled in the art could readily substitute a hydraulically actuated cylinder for the pneumatic cylinder in assembly 10, or could employ some other suitable (and not necessarily extensible) device, such as an electric motor-operated linkage. Of course, in the alternative configurations just mentioned, suitable hydraulic lines, electric lines, or the like would be substituted for the compressed air supply and control lines which are described herein with respect to the preferred embodiment.

As is perhaps best shown in FIGS. 2-3, pneumatic cylinder 12, as is conventional, has a generally cylindrical upper body portion 36, from which a lower rod portion 38 extends. The body portion of the cylinder is made up generally of a tube member 40, which encloses the piston assembly 42 and a coil return spring 44, the operation of which will be described below. The upper and lower ends of the tube member are closed by cap members 46 and 48, respectively, and in the embodiment illustrated, these are hexagonal caps which are threaded on to the ends of the tube member. The lower rod portion 38 of the assembly (this being the rod portion of the piston assembly 42) passes through a cooperating bore (not shown) in lower cap member 48; the lower end of rod portion 38 is threaded, and this is received in a corresponding threaded bore (not shown) in the brake pedal attachment fitting 14 so that the pneumatic cylinder assembly is securely attached thereto. Similarly, at the upper end of the cylinder assembly there is a threaded stud or boss 50 which extends from the upper cap member 46, and this is received in a corresponding threaded bore (not shown) in steering wheel attachment fitting 16, so that the cylinder assembly is securely mounted to this fitting as well. This arrangement provides for a clean and sturdy actuator assembly, and has been found to provide quite adequate resistance to what lateral bending forces are experienced during operation. It should also be noted that the exemplary pneumatic cylinder assembly described above, with its tubular body and threaded end caps, etc., may be readily constructed from "off-the-shelf" parts which are available from suppliers of pneumatic cylinders and components therefor, such as Aurora Air Products, Inc., of Aurora, Ill. Furthermore, in some embodiments of the present invention, the positions of the attachment fittings 14, 16 may be switched or "swapped" end-for-end on the pneumatic cylinder, so that the extendible piston rod is mounted to the steering wheel attachment fitting and the body of the cylinder is mounted to the pedal fitting.

Figure 4:
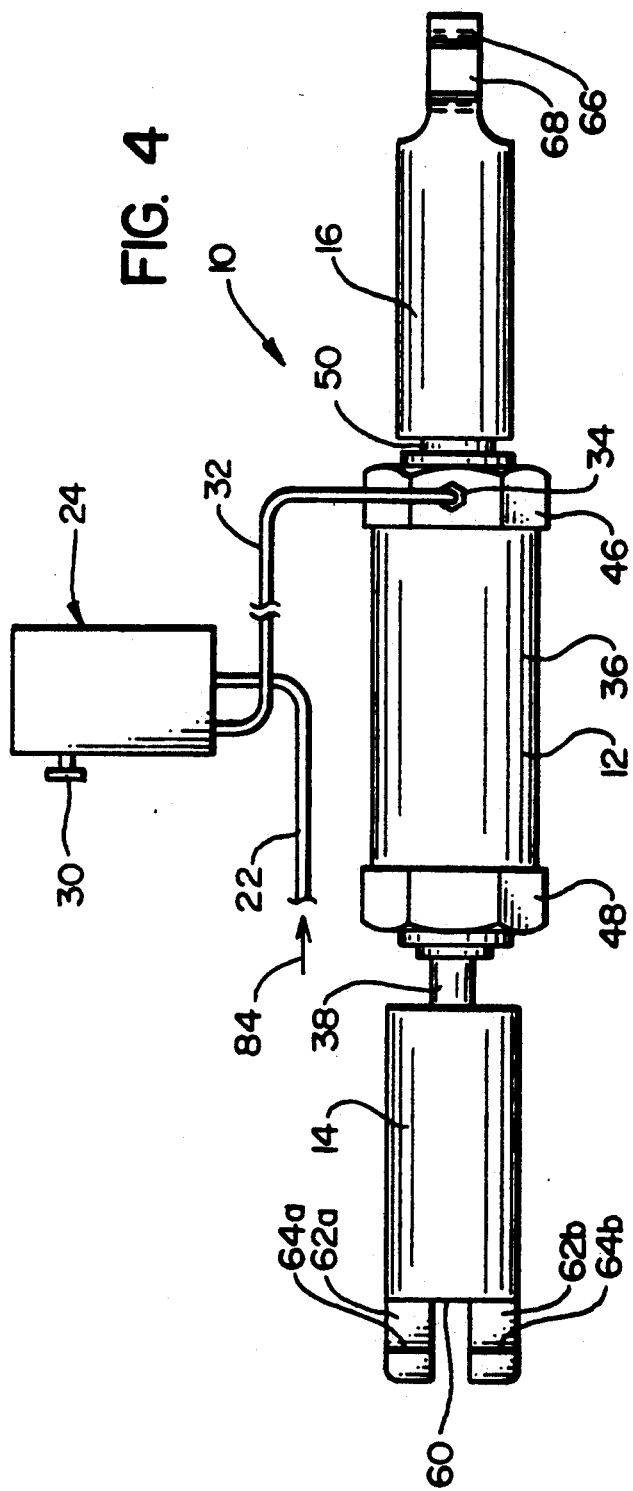
FIG. 4 is a bottom plan view of the actuator assembly of FIGS. 1-3, showing the configuration of the attachment fittings of the assembly.

As noted above, the two attachment fittings 14, 16 are configured to detachably engage the brake pedal and steering wheel of the vehicle. As is shown in FIGS. 2-3, attachment fitting 14 is an elongate structure (substantially cylindrical in the embodiment illustrated), this having sufficient length to span the distance from the lower end of the pneumatic cylinder piston rod to a normally-positioned brake pedal 18. As is conventional, brake pedal 18 is made up of a foot pad portion 56 and a lever arm portion 58. The lower end of fitting 14 has a generally planar end-face portion 60 which is configured to abut the upper surface of the foot pad portion 56 of the brake pedal, and the hook member 62 extends from this so as to fit behind foot pad 56. As is best shown in FIG. 4, hook member 62 is bifurcated so that there are first and second hook portions 62a and 62b, which fit around and along the sides of the lever arm portion 58 of the brake pedal so that the end-face 60 of attachment fitting 14 is centrally positioned on the foot pad 56, and also so as to stabilize the attachment fitting on the brake pedal. Each of these portions 62a, 62b of hook member 62 is provided with an upwardly facing surface 64a, 64b which abuts the backside of foot pad 56 so as to hold the fitting in place, and so as to enable the brake pedal to be drawn upwardly by the actuator assembly if necessary. Accordingly, hook member 62 essentially defines a receiving area for engaging the foot pad of the brake pedal.

At the other end of actuator assembly 10 there is the steering wheel attachment fitting 16. In overall configuration, this is an elongate member which is generally similar to the brake pedal attachment fitting 14. However, at the upper end of this attachment fitting 16 there is a hook member 66 which is configured to engage the steering wheel 20 of the vehicle. This hook member 66 defines a generally circular or cylindrical receiving area 68 which is sized to receive the rims of steering wheels of various sizes. The lateral opening 70 into this receiving area is preferably narrowed somewhat (i.e., its width is somewhat less than the diameter of the circular receiving area), yet is still sufficiently wide to receive the rims of steering wheels of various sizes; this helps prevent the hook member 66 from becoming dislodged from the steering wheel during operation of the actuator assembly, because, in addition to the weight of the assembly which will be resting on the inside of the rim, the rim will be pushed toward the upper or lower limits of the circular receiving area, and out of alignment with the receiving/exit opening 70. Both the opening 70 and receiving area 68 are preferably lined with a layer of resilient cushioning material 72, such as a rubber grommet, so as to prevent damage to the rim of the steering wheel 20; alternatively, the entire end of the attachment fitting may be covered with a resilient coating (e.g., "rubberized") so as to prevent damage to the steering wheel.

The attachment fittings 14 and 16 can be fabricated of any suitable material, although it has been found economically advantageous to employ metal or plastic castings for this purpose.

As was previously noted, a return spring is used to return the actuator to its retracted position. In the embodiment which is illustrated, the return spring 44 is enclosed within the pneumatic cylinder, and, as is shown in FIG. 2, this is positioned within the tube member 40 of the cylinder assembly, between the lower end thereof and the head of the piston assembly, so that it extends concentrically around the rod of the piston assembly. When the piston assembly is in the retracted position as shown in FIG. 2, the return spring 44 is in a relatively expanded configuration, although it is generally preferable that it still be under some compression in this position so as to prevent the assembly from extending inadvertently due to the force of gravity. When the actuator assembly 10 is extended, the spring 44 becomes compressed between the piston head and the bottom of the cylinder, so that it exerts a force tending to bias the attachment fittings back towards one another; the biasing force which is thus generated is sufficient to cause the actuator assembly to return to its retracted configuration when the air pressure is bled off from the pneumatic cylinder 12.

In some embodiments of the invention, it may be found desirable to use pneumatic cylinders (such as the automotive "air shocks" mentioned above) which lack internal return springs. In this case, an external return spring arrangement can be employed, such as, for example, elongated coil springs mounted to eye bolts on the steering wheel and brake attachment fittings so that these become tensioned when the actuator assembly is extended.

FIGS. 2 and 3 also clearly show the compressed air supply and control lines, and associated components which are employed to selectively control the extension and retraction of actuator assembly 10. As was previously discussed, the compressed air is supplied to the portable air pressure control assembly 24 via compressed air supply line 22, in the direction indicated by arrow 84. The air pressure is controllably reduced by the regulator in assembly 24, and is then supplied via the compressed air control line 32 to the connection fitting 34 on the pneumatic cylinder assembly. In this respect, it will be understood that the air lines 22 and 32, while being shown in abbreviated form in FIG. 4 for convenience of illustration, are in reality sufficiently long and flexible to permit the operator to take the control valve 24 with him to each of the wheel cylinders; for example, it has been found suitable to use 20' lengths of ¼" flexible air hose for each of the lines 22 and 32.

Figure 5:
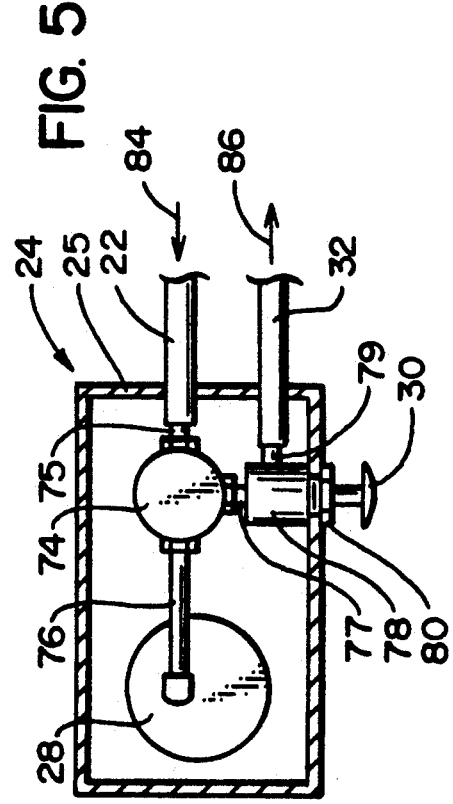
FIG. 5 is an underside plan view of the portable control assembly for providing remote control of the actuation assembly of FIGS. 1-4.

FIG. 5 shows the components which make up the portable control assembly 24 in greater detail. As was noted above, this is provided with a housing 25, and this encloses a conventional air pressure regulator 74 which is operated by the control knob which extends from the housing; a commercially available regulator which has been found eminently suitable for this application is the Model RO7 Miniature Regulator which is available from the Norgren Company of Littleton, Colo. The inlet side of the regulator is provided with an attachment fitting 75 which is connected to the air pressure supply hose 22, while a gauge outlet of the regulator is connected via a second connector 76 to the pressure gauge 28. The main outlet of the regulator is connected via a third connector 77 to the inlet side of a control valve 78, which is operated by external button 30, with the outlet side of the control valve being connected via connector 79 to the control pressure line 32. The valve assembly itself is secured against housing 25 by a sleeve nut arrangement 80.

Control valve 78 has at least two operative positions which can be selected by depressing/releasing button 30, and these can be conveniently referred to as the "pressure" and "release" positions. When the control button is depressed to select the "pressure" position (as indicated by arrow 82 in FIG. 3), the compressed air is fed from the pressure supply line 22 through the control line 32 into pneumatic cylinder 12, as indicated by arrows 84 and 86. As the pressure builds in the pneumatic cylinder, this extends the lower rod portion 46 outwardly so that it and the brake pedal attachment fitting 14 on its lower end extend downwardly in the direction indicated by arrow 88 in FIG. 3. For example, in the exemplary embodiment which is illustrated, the rod portion and brake pedal attachment fitting extend by a distance of about 8 inches so as to depress the brake pedal, while the other end of the actuator assembly is held in place by the steering wheel. This amount of extension has been found suitable to permit the actuator assembly to be used with the vast majority of automobiles and trucks, which normally have their controls positioned in generally similar locations so as to be conveniently positioned for most drivers. The operator can adjust the air pressure which is supplied to the pneumatic cylinder to the desired value by means of the regulator 74, which will cause the cylinder to extend the actuator assembly with the desired force, but not so forcefully so as to cause damage when the pedal reaches the end of its travel. When the pedal reaches this point, continued application of the air pressure, by keeping the control valve in the "pressure" position, will hold the pedal in the depressed position for as long as the operator desires.

Then, to release the pedal and return it to its non-depressed position, as in preparation for another stroke, the operator releases button 30 so that the control valve 78 returns to the "release" position. This shuts off the supply of compressed air from line 22, and bleeds off the air pressure in pneumatic cylinder 12, back through the control line 32. As this is done, the compressed return spring biases the end attachment fittings back towards one another, moving the actuator assembly 10 back to its retracted configuration. In this way, the operator can pump the brake pedal as many times and in whatever manner he desires in order to carry out the proper bleeding of the brake system, without having to have an assistant in the car to do this.

An exemplary operating procedure for using the system of the present invention may be summarized as follows. The regulator is set to the closed position and the control valve 78 is set in the release position. The air supply is connected to the regulator, and the actuator assembly is then ready to be placed in the vehicle. To do this, the pedal attachment fitting is set over the brake pedal, and then the steering wheel attachment fitting is slipped over the rim of the steering wheel; this may be done by extending the assembly as necessary using manual force, or the air pressure controls can be used to do this. The operator then adjusts the air pressure regulator to a setting which satisfies the factory specification for bleed pressure, and the system is ready for use. He then goes to the wheel cylinder, carrying the portable control assembly 24 with him, opens the bleed valve, and begins the pumping procedure. Typically, to do this he may switch the control valve to the "pressure" position for approximately 3 seconds to depress the brake pedal, and then shift back to the "release" position to lift the pedal back up again, repeating this process as necessary.

The system of the present invention thus greatly facilitates the correct bleeding of brake systems, and overcomes the disadvantages which were cited above. The value of this system becomes even more pronounced in view of the relatively complex bleeding procedures which are becoming more prevalent with modern automobile braking systems. For example, many of these procedures require pumping the brake pedal many (e.g., 25-40) times, and both hard and slow pumps may be required. Furthermore, a significant waiting period (e.g. 15-30 seconds) may be required between each pump of the pedal, so the labor savings made possible by the device become even more significant in these cases. Furthermore, the adjustable pressure regulator permits the operator to set the line pressure so as to satisfy the manufacturer's specifications for bleeding pressure, and so as to apply an even and equal pedal pressure when bleeding each part of the system, thus avoiding the human error which may be introduced by having an assistant manually pump the pedal.

It is to be understood that various modifications could be made to the exemplary embodiments described herein without departing from the basic teachings of the present invention. Accordingly, the present invention is not to be limited except as by the appended claims.

What is claimed is:

1. A remotely controlled actuator for selectively depressing the pedal of a hydraulic brake system of a vehicle so as to permit said brake system to be bled by a single operator, said actuator comprising:

a pedal actuator assembly comprising:

a longitudinally extensible cylinder member having first and second ends, said cylinder member being configured to extend longitudinally between said brake pedal and a lower portion of a steering wheel rim;

a first one-piece hook portion mounted to said first end of said cylinder member, said first hook portion having a receiving area for engaging said brake pedal and a laterally extending entrance opening having a width sized to permit passage of said pedal therethrough into said receiving area; and a second one-piece hook portion mounted to said second end of said cylinder member, said second hook portion having a generally circular receiving area for engaging said steering wheel rim and a laterally extending entrance opening having a width sized to permit passage of said rim therethrough into said receiving area; and a portable control assembly for selectively extending and retracting said cylinder member of said actuator assembly so that said first hook portion alternately depresses and raises said brake pedal as said second hook portion reacts against said steering wheel rim;

said openings into said receiving areas in said first and second hook portions extending generally parallel to one another and to one side of said actuator assembly so as to permit said hook portions to be set over said brake pedal and steering wheel rim so that said hook portions are retained on said pedal and rim by the weight of said actuator assembly, and said circular receiving area in said second hook portion having a fixed diameter sized larger than a cross-sectional diameter of said steering wheel rim, and also larger than said width of said entrance opening in said second hook portion so that said circular receiving area has first and second extremities which extend longitudinally on either side of said entrance opening, so that as said cylinder member is alternately extended and retracted with said steering wheel rim in said receiving area of said second hook portion, said second hook portion shifts longitudinally on said steering wheel rim so that said rim is positioned alternately within said first and second extremities of said circular receiving area and out of register with said entrance opening, so as to prevent accidental displacement of said rim through said entrance opening of said second hook portion as said first hook portion of said actuator assembly alternately depresses and raises said pedal of said brake system.

2. The actuator of claim 1, wherein said longitudinally extensible cylinder member is a pneumatic cylinder.

3. The actuator of claim 2, wherein said portable control assembly comprises a control valve for selectively connecting a supply of compressed air to said pneumatic cylinder so as to extend said cylinder.

4. The actuator of claim 3, wherein said portable control assembly further comprises a variably adjustable pressure regulator for reducing said compressed air to a predetermined pressure such that said pneumatic cylinder depresses said pedal with a predetermined level of force.

5. The actuator of claim 3, wherein said actuator assembly further comprises:

a spring mounted to said pneumatic cylinder so as to bias said cylinder towards a retracted position; and valve means responsive to operation of said control assembly for bleeding said compressed air from said pneumatic cylinder so that said spring biases said cylinder to said retracted position.

6. The actuator of claim 1, wherein said receiving area in said first hook portion is defined by an outer portion which is configured to abut a back side of said brake pedal which faces generally away from said steering wheel rim and an inner portion which is configured to abut a front side of said pedal which faces generally toward said steering wheel rim.

7. The actuator of claim 6, wherein said outer portion of said first hook portion is bifurcated so as to extend along first and second sides of a lever arm which is mounted to said back side of said pedal, so that said first hook portion is stabilized on said pedal and said inner portion thereof is positioned centrally on said front side of said pedal.

8. The actuator of claim 7, wherein said fixed diameter of said circular receiving area in said second hook portion is sized sufficiently large that said circular receiving area is able to receive steering wheel rims having various cross-sectional diameters within a predetermined range.

9. The actuator of claim 1, wherein said second hook portion further comprises a resilient grommet mounted within said circular receiving area for absorbing impacts of said rim against said extremities of said receiving area so as to prevent damage to said rim as said second hook portion is shifted longitudinally thereon.

* * * * *